United States Patent
Sato et al.

(10) Patent No.: US 7,086,243 B2
(45) Date of Patent: Aug. 8, 2006

(54) SETTING DEVICE OF A FORCE FEEDBACK TYPE

(75) Inventors: Hiroyuki Sato, Miyagi-ken (JP); Kazuyuki Murakami, Miyagi-ken (JP); Tomohiro Oikawa, Miyagi-ken (JP); Yasuhiro Miyasaka, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 160 days.

(21) Appl. No.: 10/932,673

(22) Filed: Sep. 2, 2004

(65) Prior Publication Data

US 2005/0052151 A1    Mar. 10, 2005

(30) Foreign Application Priority Data

Sep. 5, 2003   (JP)   ............................. 2003-314117

(51) Int. Cl.
    *F25D 17/00*   (2006.01)
    *G09G 5/00*    (2006.01)
    *G05B 11/01*   (2006.01)

(52) U.S. Cl. .................... 62/178; 345/156; 345/184; 318/628

(58) Field of Classification Search .................. 62/178, 62/180; 345/156, 184; 236/1 C; 318/628, 318/634

See application file for complete search history.

(56) References Cited

U.S. PATENT DOCUMENTS

| | | | | |
|---|---|---|---|---|
| 6,154,201 | A  * | 11/2000 | Levin et al. .................. | 345/184 |
| 6,636,197 | B1 * | 10/2003 | Goldenberg et al. ......... | 345/156 |
| 6,724,364 | B1 * | 4/2004  | Tani ............................. | 345/156 |
| 2003/0184518 | A1 * | 10/2003 | Numata et al. .............. | 345/156 |
| 2004/0100440 | A1 * | 5/2004  | Levin et al. .................. | 345/156 |
| 2004/0201605 | A1 * | 10/2004 | Matsumoto et al. ......... | 345/701 |
| 2004/0233162 | A1 * | 11/2004 | Kobayashi ................... | 345/156 |
| 2005/0007060 | A1 * | 1/2005  | Sato ............................. | 318/638 |
| 2006/0012584 | A1 * | 1/2006  | Vassallo et al. .............. | 345/184 |

FOREIGN PATENT DOCUMENTS

JP    2002-189560    7/2002

\* cited by examiner

*Primary Examiner*—Marc Norman
(74) *Attorney, Agent, or Firm*—Brinks Hofer Gilson & Lione

(57) ABSTRACT

A setting device of a force feedback type has an operating unit commonly used to set a plurality of control items of an electronic device. To provide a different sensation to the operating unit depending on the control items, a force feedback pattern for an airflow rate setting is provided to a rotary knob, which is the operating unit, so that an operation of the rotary knob to rotate beyond an upper limit or a lower limit of an airflow rate range is restricted, and a force feedback pattern for the air outlet setting is provided to the rotary knob so that a rotational operation of the rotary knob is not restricted.

3 Claims, 4 Drawing Sheets

SETTING DEVICE OF A FORCE FEEDBACK TYPE

This application claims the benefit of priority to Japanese Patent Application No. 2003-314117 filed on Sept. 5, 2003, herein incorporated by reference.

BACKGROUND OF THE INVENTION

1. Field of the Invention

The present invention relates to a setting device of a force feedback type in which a plurality of control items of an electronic device are set through a single common operating unit. When one of the control items is set, a force feedback pattern which is inherent in the control item is provided to the operating unit so that an operator is made aware of the set control item by the sensation of operation of the operating unit. In particular, the present invention relates to a setting device of a force feedback type providing improved force feedback to an operating unit.

2. Description of the Related Art

Among in-car setting devices, such as automotive air conditioner setting devices, setting devices of a force feedback type are known. In the automotive air conditioner setting device, a plurality of control items, such as an airflow rate, temperature, and an air outlet, can be set by a rotary knob (operating unit) common to all of the control item settings and a different force-feedback predetermined pattern is provided to each control item setting. In the force-feedback pattern, a click sensation is provided as force feedback for every predetermined angle rotation of the rotary knob. A different pattern is created for each control item by changing the click sensation and time interval between the click sensations (refer to, for example, Japanese Unexamined Patent Application Publication No. 2002-189560, in particular, paragraph 0033 and FIG. 6).

However, although such known setting devices of a force feedback type provide different force-feedback patterns by changing the click sensation and time interval between the click sensations, all of the click sensations are similar for operators. Therefore, in a situation where an operator cannot concentrate on a sensation provided by the rotary knob, as is the case where the operator operates the rotary knob while driving a car, the operator can hardly distinguish the sensations for the respective control items and cannot sometimes recognize which control item the operator is attempting to set, which is a problem.

SUMMARY OF THE INVENTION

Accordingly, it is an object of the present invention to provide a setting device of a force feedback type that allows an operator to easily recognize which control item of an electronic device the operator is attempting to set by easy distinction of sensations provided by an operating unit of the setting device common to a plurality of control items.

According to the present invention, a setting device of a force feedback type includes a selection unit for selecting any one of control items of an electronic device; a setting unit for changing data of the control item selected by the selection unit, the setting unit being common to the control items; operating state detecting means for detecting an operating state of the setting unit; force feedback providing means for providing force feedback to the setting unit; and a control unit for controlling the force feedback providing means such that, after one of the control items is selected by the selection unit, the force feedback providing means provides the setting unit with a predetermined force feedback pattern for the selected control item based on the operating state detected by the operating state detecting means, wherein a force feedback pattern for at least one control item is determined so that the operation of the setting unit is restricted when an operating state of the setting unit reaches a predetermined state, and a force feedback pattern for at least one of the other control items is determined so that the operation of the setting unit is not restricted.

In the above-described structure according to the present invention, a sensation provided by the setting unit when the operation of the setting unit is restricted is obviously different from a sensation when the operation of the setting unit is not restricted. Accordingly, the operator can easily recognize which control item the operator is setting.

Preferably, the electronic device is an automotive air conditioner capable of changing data of an airflow rate and an air outlet as the control items, a force feedback pattern for setting the airflow rate is determined so that a rotational operation of a rotary knob has a range corresponding to a setting range of the airflow rate and an operation to rotate the rotary knob beyond an upper limit or a lower limit of the range is restricted, and a force feedback pattern for setting the air outlet is determined so that a rotational operation of the rotary knob is not restricted.

In the above-described structure according to the present invention, a sensation provided by the setting unit during an airflow rate setting is reliably distinguished from a sensation provided by the setting unit during an air outlet setting. As a result, the operator can reliably recognize which one of airflow rate and air outlet the operator is attempting to set.

Preferably, the electronic device is an automotive air conditioner capable of changing data of temperature and an air outlet as the control items, a force feedback pattern for the temperature setting is determined so that a rotational operation of a rotary knob has a range corresponding to a setting range of the temperature and an operation to rotate the rotary knob beyond an upper limit or a lower limit of the range is restricted, and a force feedback pattern for setting the air outlet is determined so that a rotational operation of the rotary knob is not restricted.

In the above-described structure according to the present invention, a sensation provided by the setting unit during a temperature setting is reliably distinguished from a sensation provided by the setting unit during an air outlet setting. As a result, the operator can reliably recognize which one of temperature and air outlet the operator is attempting to set.

DESCRIPTION OF THE PREFERRED EMBODIMENT

An embodiment of an in-car setting device according to the present invention will now be described with reference to FIGS. 1 to 6.

Figure 1:
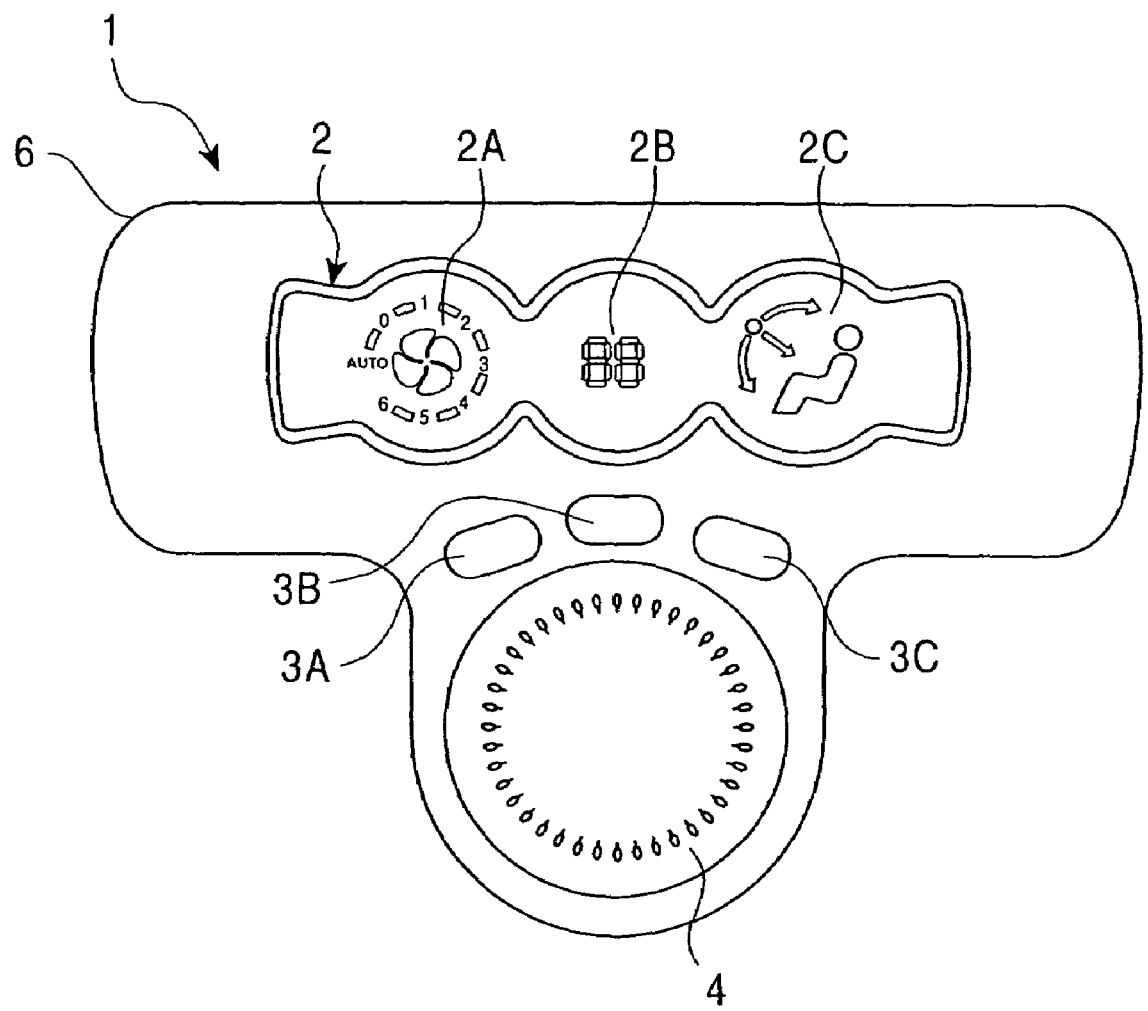
FIG. 1 is a front view of an operating device according to an embodiment of the present invention.
Figure 2:
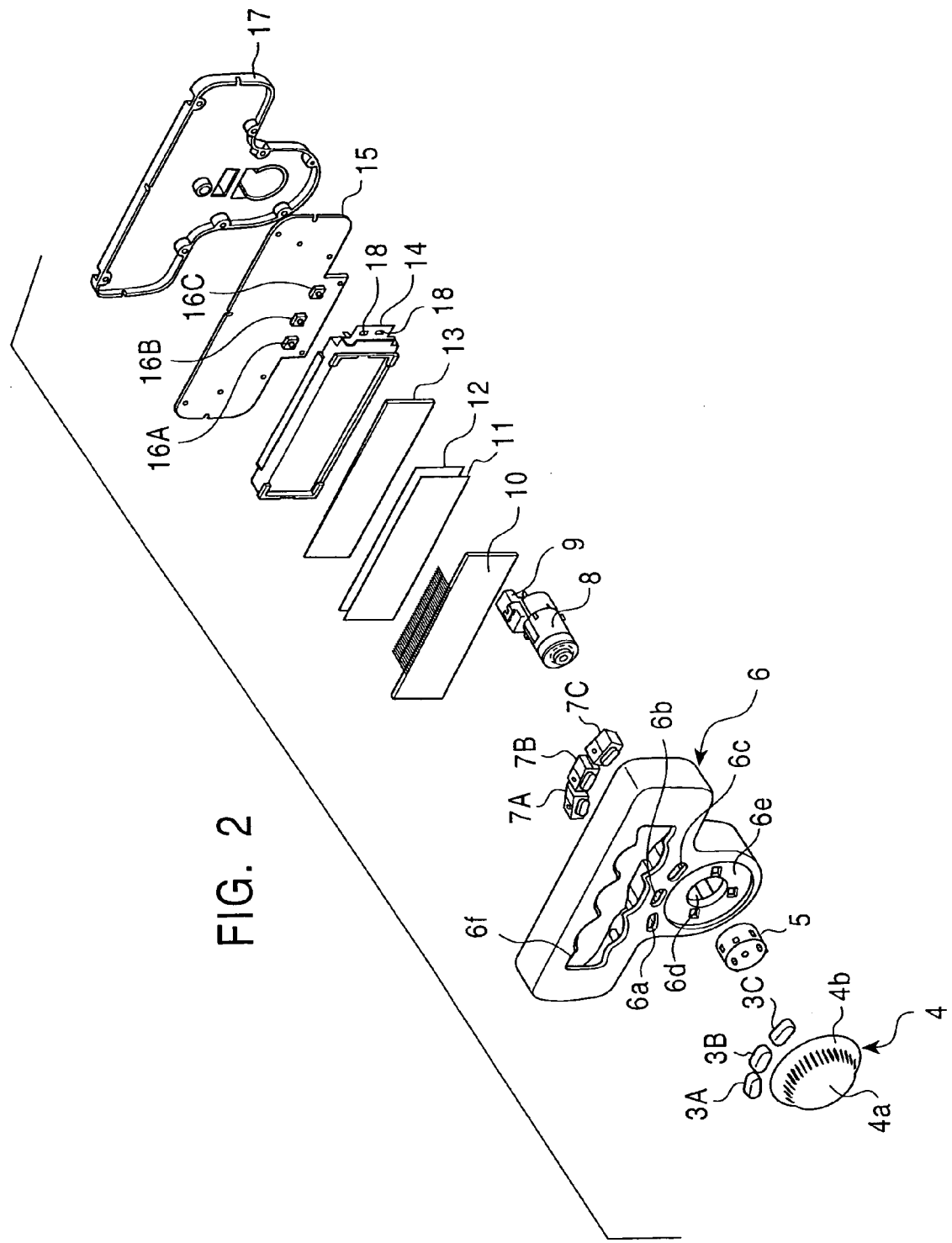
FIG. 2 is an exploded perspective view of the operating device shown in FIG. 1.
Figure 3:
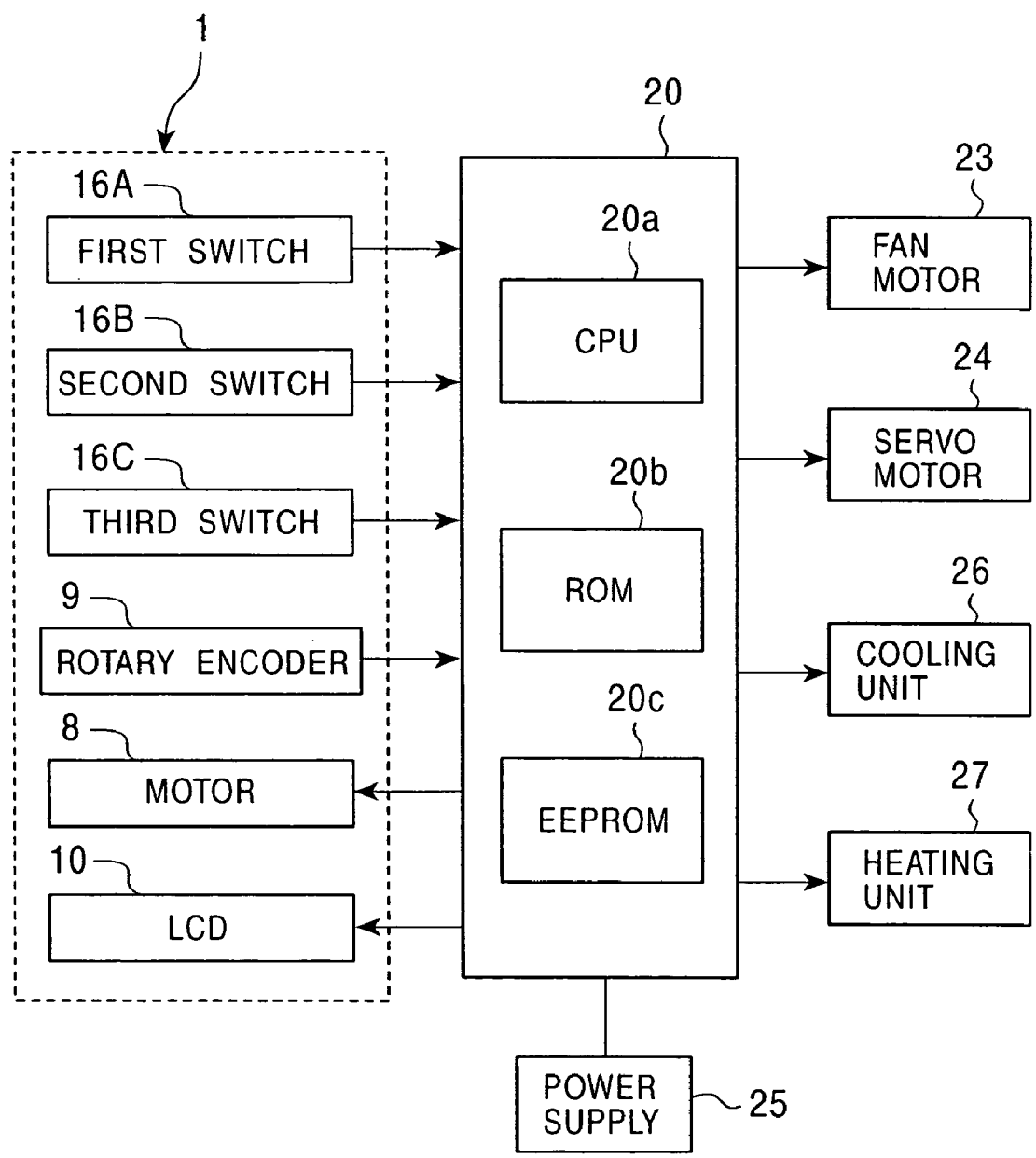
FIG. 3 is a block diagram of an electronic system according to the embodiment.
Figure 4:
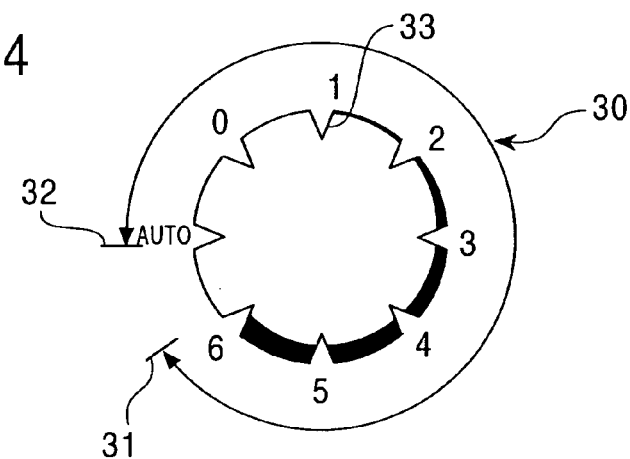
FIG. 4 is a schematic diagram illustrating a force feedback pattern for an airflow rate setting of an automotive air conditioner according to the embodiment.
Figure 5:
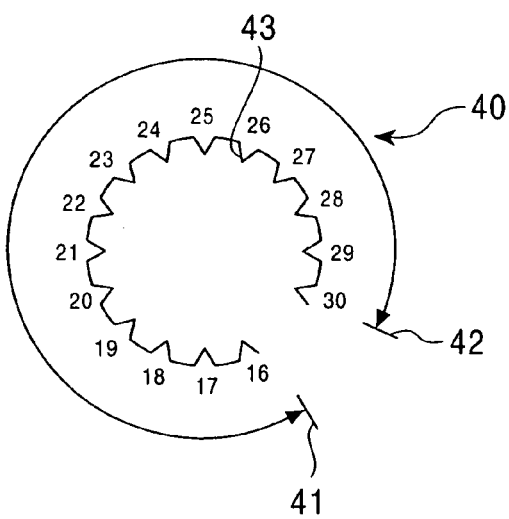
FIG. 5 is a schematic diagram illustrating a force feedback pattern for a temperature setting of the automotive air conditioner according to the embodiment.
Figure 6:
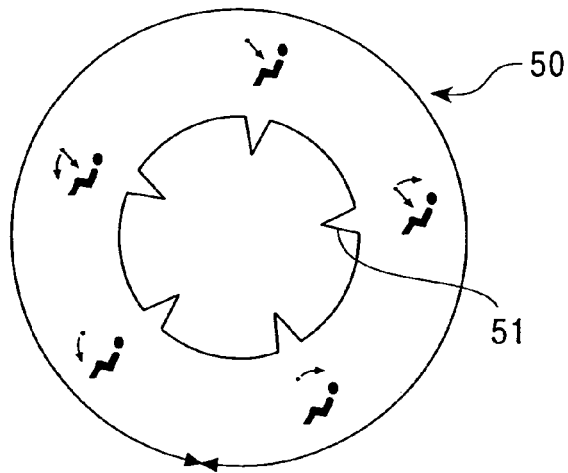
FIG. 6 is a schematic diagram illustrating a force feedback pattern for an air outlet setting of the automotive air conditioner according to the embodiment.

FIG. 1 is a front view of an operating device according to an embodiment of the present invention. FIG. 2 is an exploded perspective view of the operating device shown in FIG. 1. FIG. 3 is a block diagram of an electronic system according to the embodiment. FIG. 4 is a schematic diagram illustrating a force feedback pattern for an airflow rate setting of an automotive air conditioner according to the embodiment. FIG. 5 is a schematic diagram illustrating a force feedback pattern for a temperature setting of the automotive air conditioner according to the embodiment. FIG. 6 is a schematic diagram illustrating a force feedback pattern for an air outlet setting of the automotive air conditioner according to the embodiment.

In this embodiment, the device includes an operating unit 1. As shown in FIG. 1, the operating unit 1 includes a display unit 2, which has a plurality of closely arranged display sections, for example, first to third display sections 2A to 2C. The first to third display sections 2A to 2C display conditions of a plurality of control items, for example, a set value of an airflow rate, a set value of temperature, and a set mode of an air outlet, respectively.

The first display section 2A displays an indicator, "AUTO", which indicates an automatic operation of airflow rates, or, for example, numbers "0" to "6" and bars between the numbers, which indicate six levels of the airflow rate. That is, when the automatic operation is selected, only the indicator "AUTO" is illuminated. To show the set value of the airflow rate, all the numbers "0" to "6" and all the bars up to the number of the set value are illuminated. For example, if a set value "3" is selected for the airflow rate, all the numbers "0" to "6", a bar between the numbers "0" and "1", a bar between the numbers "1" and "2", and a bar between the numbers "2" and "3" are illuminated.

The second display section 2B displays a digital number indicating the set temperature, which ranges from a minimum of 16° C. to a maximum of 30° C. in steps of 1° C.

The third display section 2C displays a set mode of the air outlet by lighting arrows, each of which indicates the airflow direction to a face, a body, or feet. The set mode includes an airflow to the feet, an airflow to the feet and body, an airflow to the body, an airflow to the body and face, and an airflow to the face.

In a neighboring area under each of the first to third display sections 2A to 2C, a selection unit for selecting a control item displayed in the display section is disposed. That is, first to third push selection buttons 3A to 3C are respectively disposed in these neighboring areas. Specifically, in the neighboring area under the first display section 2A, the first selection button 3A is disposed so as to select an airflow rate as the control item. Similarly, in the neighboring area under the second display section 2B, the second selection button 3B is disposed so as to select temperature as the control item. Furthermore, in the neighboring area under the third display section 2C, the third selection button 3C is disposed so as to select an air outlet as the control item.

In a neighboring area under the first to third selection buttons 3A to 3C, a setting unit common to all the control items is disposed so as to change a setting for the selected control item. For example, a rotary knob 4 is disposed in this area. The primary shape of the rotary knob 4 is circular in cross-section in the direction orthogonal to its rotational axis. The rotary knob 4 is rotationally operated about the axis of the circle. At the center of the rotary knob 4, a protrusion 4a extending outwardly (from the back to front side of the page) is formed, and a plurality of ridges 4b are formed on the external peripheral surface of the protrusion 4a so as to serve as a slip stopper when operator's fingers hold the protrusion 4a.

As shown in FIG. 2, the operating unit 1 also includes a front cover 6 and a back cover 17, both of which form a casing. The front cover 6 includes sliding holes 6a to 6c into which the respective first to third selection buttons 3A to 3C are slidably fitted; a recess 6e into which the rotary knob 4 is slidably fitted; a shaft hole 6d formed at the center of the recess 6e, to which a holder 5 that secures the rotary knob 4 with a motor 8 is rotatably inserted; and a frame 6f, which defines the shape of a display unit 2.

The casing composed of the front cover 6 and the back cover 17 accommodates a printed circuit board 15, on which first to third push button switches 16A to 16C are mounted. The printed circuit board 15 is secured with the back cover 17. The first to third selection buttons 3A to 3C are supported by first to third button holders 7A to 7C, respectively. The first to third selection buttons 3A to 3C push the first to third push button switches 16A to 16C via the first to third button holders 7A to 7C, respectively.

Furthermore, the casing accommodates force feedback means that provides force feedback to the rotary knob 4, that is, the motor 8 that provides a rotational force to the rotary knob 4. A rotary encoder 9 is attached to the motor 8 to detect a rotational angle of the output shaft of the motor 8, that is, a rotational angle of the rotary knob 4.

Disposed between the front cover 6 and the printed circuit board 15 are a liquid crystal display (LCD) 10 that forms the display unit 2 whose shape is defined by the frame 6f, a light guide plate 13 which leads light emitted from a chip LED 18 to the LCD 10, light diffusing sheets 11 and 12 disposed between the LCD 10 and the light guide plate 13, and an LCD holder 14 which supports the light guide plate 13 and the light diffusing sheets 11 and 12 and mounts the chip LED 18 on its side surface.

A control unit 20 includes a CPU 20a, a ROM 20b, and an EEPROM 20c, all of which are powered by a power supply 25.

The CPU 20a controls the motor 8, the LCD 10, and the automotive air conditioner in response to ON signals from the first to third push button switches 16A to 16C and a detection signal from the rotary encoder 9. The CPU 20a also controls the entire control unit 20.

The ROM 20b pre-stores control programs and control functions for controlling the motor 8, the LCD 10, the automotive air conditioner, and the entire control unit 20. The ROM 20b is pre-installed in the air conditioner, and the unused area of the memory is used to store the control programs for the motor 8 and the LCD 10.

The EEPROM 20c stores calculated values from the CPU 20a, control modes of a fan motor 23, servo motors 24 (a single servo motor is depicted in the drawing), a cooling unit 26, and a heating unit 27 in the automotive air conditioner, control modes of the LCD 10 and the motor 8 in the operating unit 1, detection values from the rotary encoder 9, and detection values from various sensors used to control the automotive air conditioner.

The fan motor 23 rotates a fan in the automotive air conditioner. The servo motors 24 drive dampers to control an airflow rate through an air outlet. The cooling unit 26, when a cooling mode is selected, cools air in response to a set temperature value and detection values from various sensors, while the heating unit 27, when a heating mode is selected, heats air in response to a set temperature value and detection values from the various sensors.

In this embodiment, patterns of force feedback provided to the rotary knob 4 by the motor 8 are, in particular, determined as shown in FIGS. 4 to 6, which correspond to patterns for an airflow rate setting, a temperature setting, and an air outlet setting, respectively.

As shown in FIG. 4, in a force feedback pattern 30 for the airflow rate setting, the rotary knob 4 is used to set an airflow rate, and both operations required to rotate the rotary knob 4 beyond an upper rotational limit 31 and below a lower rotational limit 32 are restricted. To restrict the rotations of the rotary knob 4, a rotational force that is reverse to the moving direction is increased so that an operator recognizes that an additional rotation cannot be allowed. If the operator forces the rotary knob 4 to rotate beyond the upper rotational limit 31 or the lower rotational limit 32, the rotary knob 4, when the operator's fingers release it, returns to the position corresponding to the upper rotational limit 31 or the lower rotational limit 32.

Additionally, in the force feedback pattern 30 for the airflow rate setting, when a rotational angle of the rotary knob 4 reaches each level of the airflow rate, that is, each angle corresponding to "AUTO", or one of "1" to "6", a click sensation 33 is generated in the rotary knob 4. The click sensation 33 is generated such that, when a rotational angle of the rotary knob 4 reaches each angle corresponding to "AUTO", or one of "1" to "6", a click sensation 33, the motor 8 temporarily provides the rotary knob 4 with a rotational force of a predetermined strength in the moving direction of the rotary knob 4, or the motor 8 temporarily provides the rotary knob 4 with a rotational force of a predetermined strength in the moving direction of the rotary knob 4 followed by a temporary rotational force of a predetermined strength in the opposite moving direction. Click sensations 43 and 51, which will be described below, are also generated in the same manner.

Moreover, in the force feedback pattern 30 for the airflow rate setting, as shown by black areas in FIG. 4, while the rotary knob 4 rotates in the direction to increase the airflow rate, the motor 8 provides the rotary knob 4 with a rotational force in the opposite moving direction of the rotary knob 4. As the rotational angle in the direction to increase the airflow rate increases, the rotational force in the opposite direction increases. Additionally, as the rotary knob 4 rotates in the direction to decrease the airflow rate, a resistance force applied to the rotary knob 4 by the motor 8 decreases.

As shown in FIG. 5, in a force feedback pattern 40 for the temperature setting, the rotary knob 4 is used to set a temperature, and both operations to rotate the rotary knob 4 beyond an upper rotational limit 41 and a lower rotational limit 42 are restricted.

In the force feedback pattern 40 for the temperature setting, a click sensation 44 that is weaker than that for setting the airflow rate is generated for each rotational angle of the rotary knob 4 corresponding to a temperature of 1° C.

As shown in FIG. 6, in a force feedback pattern 50 for the air outlet setting, a rotation of the rotary knob 4 is not restricted, that is, unlike the above-described airflow rate setting and temperature setting, a rotational angle range is not set. Every time the rotary knob 4 reaches angles corresponding to setting points of the air outlet, a click sensation 51 is generated in the rotary knob 4.

According to the embodiment, the setting device having the above-described structure operates as follows:

Airflow Rate Setting

The operation for setting an airflow rate will now be described.

First, the control unit 20 of the operating unit 1 displays the last set airflow rate, temperature, and air outlet in the first to third display sections 2A to 2C of the display unit 2, respectively. The operating unit 1 is in a mode in which neither the setting of the airflow rate, temperature, nor air outlet is changed even though the rotary knob 4 rotates. This mode is referred to as "a display mode". At that time, a number "3" is displayed as a set value of the airflow rate in the first display section 2A. That is, numbers "0" to "6", a bar between the numbers "0" and "1", a bar between the numbers "1" and "2", and a bar between the numbers "2" and "3" are illuminated.

In this state, when an operator, for example, a car driver depresses the first selection button 3A with the driver's second finger while the driver grasps the protrusion 4a of the rotary knob 4 between the tips of the driver's first and third fingers, the first push button switch 16A is pushed via the first button holder 7A. The first push button switch 16A delivers an ON signal to the control unit 20.

Then, the control unit 20 controls the operating unit 1 to enter a mode that permits a change in an airflow rate setting, that is, an airflow rate setting mode. At this moment, in the display unit 2, only a set value of the airflow rate is illuminated in the first display section 2A, whereas a set value of the temperature and a set indicator of the air outlet are not illuminated in the first and second display sections 2B and 2C.

When the operator rotates the rotary knob 4 so that the rotary encoder 9 inputs a detection signal that indicates a rotational angle of the rotary knob 4 to the control unit 20, the control unit 20 controls the LCD 10. Thus, the set value of the airflow rate displayed in the first display section 2A increases or decreases from the previously set value.

That is, as the rotary knob 4 is rotated in the clockwise direction shown in FIG. 1, a bar between the numbers "3" and "4", a bar between the numbers "4" and "5", and a bar between the numbers "5" and "6" are illuminated in turn, while the numbers "0" to "6", the bar between the numbers "0" and "1", the bar between the numbers "1" and "2", and the bar between the numbers "2" and "3" stay lit. In contrast, as the rotary knob 4 is rotated in the counterclockwise direction, the bar between the numbers "3" and "2", the bar between the numbers "2" and "1", and the bar between the numbers "1" and "0" go out in turn. If the rotary knob 4 is further rotated in the counterclockwise direction, the numbers "0" to "6" go out and only the indicator "AUTO" is illuminated.

In the control unit 20, the indicator of an airflow rate in the first display section 2A is changed in such a way, while the motor 8 is controlled. Thus, every time the rotary encoder 9 detects rotational angles corresponding to the indicators "AUTO", "1", "2", . . . , "6", the rotary knob 4 provides the click sensation 33 to the operator. Additionally, when the rotary knob 4 reaches the rotational angle corresponding to the number "0", the operator receives a click sensation 34 that is stronger than the click sensation 33. As the operator rotates the rotary knob 4 in the direction that increases the airflow rate, the operator receives a stronger resistance force from the rotary knob 4. As the operator rotates the rotary knob 4 in the direction that decreases the airflow rate, the operator receives a weaker resistance force from the rotary knob 4. If the operator attempts to rotate the rotary knob 4 beyond the rotational angle corresponding to the maximum airflow rate "6", the operator receives a strong resistance force from the rotary knob 4, and therefore, the rotational operation is restricted. Also, if the operator attempts to rotate the rotary knob 4 beyond the rotational angle corresponding to the indicator "AUTO" representing the automatic airflow rate operation, the operator receives a strong resistance force from the rotary knob 4, and therefore, the operation is restricted.

If the rotary knob 4 is not operated for a predetermined time period, for example, 2 seconds, the control unit 20 controls the operating unit 1 to illuminate all indicators of the airflow rate, the temperature, and the air outlet and to return to the display mode in which every setting is unchanged even though the rotary knob 4 rotates.

Thereafter, the control unit 20 controls the fan motor 23 and the servo motors 24 so that the fan is driven so as to rotate at a speed corresponding to the set airflow rate and the damper is also adjusted at a gate opening rate corresponding to the set airflow rate.

Temperature Setting

The operation for setting the temperature will now be described.

First, the operating unit 1 is in the display mode. At this moment, the second display section 2B of the display unit 2 displays a set value of temperature, for example, a number "24" which indicates 24° C.

An operator depresses the second selection button 3B, which pushes the second push button switch 16B via the second button holder 7B. The second push button switch 16B delivers an ON signal to the control unit 20.

Subsequently, the control unit 20 controls the operating unit 1 to enter a mode that permits a change in the temperature setting, that is, the temperature setting mode. At this moment, in the display unit 2, only a set value of the temperature is illuminated in the second display section 2B, whereas a set value of the airflow rate and a set indicator of the air outlet disappear in the first and third display sections 2A and 2C.

When the operator rotates the rotary knob 4, the rotary encoder 9 inputs a detection signal to the control unit 20 to control the LCD 10. Thus, the set value of the temperature displayed in the second display section 2B increases or decreases from the previously set value.

That is, as the rotary knob 4 rotates in the clockwise direction shown in FIG. 1, the displayed number "24" in the second display section 2B increases by one, such as "25", "26", . . . , and "30". In contrast, as the rotary knob 4 rotates in the counterclockwise direction, the displayed number "24" decreases by one, such as "23", "22", . . . , and "16".

In the control unit 20, the number set for temperature in the second display section 2B is increased or decreased in such a way, while the motor 8 is controlled. Thus, every time the rotary encoder 9 detects a rotational angle change corresponding to 1° C., the rotary knob 4 provides the click sensation 44 to the operator.

If the rotary knob 4 is not operated for 2 seconds, the control unit 20 controls the operating unit 1 to illuminate all indicators of the airflow rate, the temperature, and the air outlet and to return to the display mode in which every setting is unchanged even though the rotary knob 4 rotates.

Then, the control unit 20 controls the automotive air conditioner in accordance with the set value. That is, the heating unit 27, when a heating is selected, is controlled, while the cooling unit 26, when a cooling mode is selected, is controlled.

Air Outlet Setting

The operation for setting the air outlet will now be described.

First, the operating unit 1 is in the display mode. At this moment, the third display section 2C of the display unit 2 displays a set mode of the air outlet, for example, an indicator of airflow to a body.

An operator then depresses the third selection button 3C, which pushes the third push button switch 16C via the third button holder 7C. The third push button switch 16C delivers an ON signal to the control unit 20.

Subsequently, the control unit 20 controls the operating unit 1 to enter a mode that permits a change in the air outlet setting, that is, the air outlet setting mode. At this moment, in the display unit 2, only an indicator of the air outlet is illuminated in the third display section 2C, whereas a set value of the temperature in the second display section 2B and a set value of the airflow rate in the first display section 2A disappear.

When the operator rotates the rotary knob 4, the rotary encoder 9 inputs a detection signal to the control unit 20 to control the LCD 10. Thus, the previously set indicator, airflow to the body, displayed in the third display section 2C is changed to another indicator of the air outlet setting.

That is, as the rotary knob 4 rotates in the clockwise direction shown in FIG. 1, the indicator of airflow to the body is switched to an indicator of airflow to the body and face, an indicator of airflow to the face, and an indicator of airflow to the feet. In contrast, as the rotary knob 4 rotates in the counterclockwise direction, the indicator of airflow to the body is switched to an indicator of airflow to the feet and body, an indicator of airflow to the feet, and an indicator of airflow to the face.

In the control unit 20, the air outlet setting indicator in the third display section 2C is changed in such a way, while the motor 8 is controlled. Thus, each time the rotary encoder 9 detects a rotational angle corresponding to airflow to the feet, airflow to the feet and body, airflow to the body, airflow to the body and face, or airflow to the face, the rotary knob 4 provides the click sensation 51 to the operator.

If the rotary knob 4 is not operated for 2 seconds, the control unit 20 controls the operating unit 1 so as to illuminate all indicators of the airflow rate, the temperature, and the air outlet and to return to the display mode in which every setting is unchanged even though the rotary knob 4 rotates.

Subsequently, the control unit 20 controls the servo motors 24 so as to open dampers corresponding to the current air outlet setting and close the other dampers.

This embodiment provides the following advantages.

In a sensation provided by the rotary knob 4 during an airflow rate setting, the rotation of the rotary knob 4 is restricted. In contrast, in a sensation provided by the rotary knob 4 during an air outlet setting, the rotation of the rotary knob 4 is not restricted. Accordingly, the sensation provided by the rotary knob 4 during an airflow rate setting is reliably distinguished from the sensation provided by the rotary knob 4 during an air outlet setting. As a result, the operator can easily recognize which control item the operator is attempting to set.

Additionally, in a sensation provided by the rotary knob 4 during a temperature setting, the rotation of the rotary knob 4 is restricted. In contrast, in the sensation provided by the rotary knob 4 during the air outlet setting, the rotation of the rotary knob 4 is not restricted. Accordingly, the sensation provided by the rotary knob 4 during a temperature setting is reliably distinguished from the sensation provided by the rotary knob 4 during an air outlet setting. As a result, the operator can easily recognize which control item the operator is attempting to set.

Furthermore, in a sensation provided by the rotary knob 4 during an airflow rate setting, a sensation of resistance received from the rotation of the rotary knob 4 is increased or decreased in accordance with an increase or decrease in the rotational angle of the rotary knob 4. In contrast, in a sensation provided by the rotary knob 4 during a temperature setting, a sensation of resistance received from the rotation of the rotary knob 4 is not increased or decreased in accordance with an increase or decrease in the rotational angle of the rotary knob 4. Accordingly, the sensation provided by the rotary knob 4 during a temperature setting is reliably distinguished from the sensation provided by the rotary knob 4 during an airflow rate setting. As a result, the operator can easily recognize which control item the operator is attempting to set.

While the embodiment of the present invention has been described with reference to an automotive air conditioner, the present invention is not intended to be limited to such an application. For example, by changing the number of display sections, display contents, and the number of selection buttons, the present invention may be applied to in-car setting devices to set the tone and volume of sound from electronic devices, such as car radios, compact disc (CD) players, and mini disc (MD) players. Furthermore, electronic devices that may be suitably applied to the present invention include, but are not limited to, in-car electronic devices which require a driver to manipulate the electronic devices without looking at operating units of the electronic devices.

The invention claimed is:

1. A setting device of a force feedback type comprising:
    a selection unit for selecting any one of control items of an electronic device;
    a setting unit for changing data of the control item selected by the selection unit, the setting unit being common to the control items;
    operating state detecting means for detecting an operating state of the setting unit;
    force feedback providing means for providing force feedback to the setting unit; and
    a control unit for controlling the force feedback providing means such that, after one of the control items is selected by the selection unit, the force feedback providing means provides the setting unit with a predetermined force feedback pattern for the selected control item based on the operating state detected by the operating state detecting means;
    wherein a force feedback pattern for at least one control item is determined so that the operation of the setting unit is restricted when the operating state of the setting unit reaches a predetermined state, and a force feedback pattern for at least one of the other control items is determined so that the operation of the setting unit is not restricted.

2. The setting device of a force feedback type according to claim 1, wherein the electronic device is an automotive air conditioner capable of changing data of an airflow rate and an air outlet as the control items, a force feedback pattern for setting the airflow rate is determined so that a rotational operation of a rotary knob has a range corresponding to a setting range of the airflow rate and an operation to rotate the rotary knob beyond an upper limit or a lower limit of the range is restricted, and a force feedback pattern for setting the air outlet is determined so that the rotational operation of the rotary knob is not restricted.

3. The setting device of a force feedback type according to claim 1, wherein the electronic device is an automotive air conditioner capable of changing data of temperature and an air outlet as the control items, a force feedback pattern for the temperature setting is determined so that a rotational operation of a rotary knob has a range corresponding to a setting range of the temperature and an operation to rotate the rotary knob beyond an upper limit or a lower limit of the range is restricted, and a force feedback pattern for setting the air outlet is determined so that the rotational operation of the rotary knob is not restricted.

* * * * *